("12") United States Patent  (10) Patent No.: US 7,526,191 B2
Lin et al. (45) Date of Patent: Apr. 28, 2009

(54) ZOOM TRACKING METHOD FOR DIGITAL CAMERA

(75) Inventors: Chin-Chih Lin, Taipei (TW); Jui-Hsiang Lo, Taipei (TW); Chiou-Shann Fuh, Shulin (TW); Chia-Hao Chang, Taipei (TW)

(73) Assignee: Primax Electronics, Ltd., Taipei (TW)

( * ) Notice: Subject to any disclaimer, the term of this patent is extended or adjusted under 35 U.S.C. 154(b) by 411 days.

(21) Appl. No.: 11/367,115

(22) Filed: Mar. 3, 2006

(65) Prior Publication Data

US 2007/0206936 A1    Sep. 6, 2007

(51) Int. Cl.
    *G03B 17/00*    (2006.01)
(52) U.S. Cl. .......................................... 396/81; 396/77
(58) Field of Classification Search .................. 396/77, 396/79, 81, 82; 348/240.99, 240.1, 240.2, 348/240.3, 345, 347
    See application file for complete search history.

(56) References Cited

U.S. PATENT DOCUMENTS

2002/0118966 A1*   8/2002   Hofer et al. ................... 396/79

* cited by examiner

*Primary Examiner*—Rodney E Fuller
(74) *Attorney, Agent, or Firm*—Apex Juris, pllc; Tracy M Heims

(57) ABSTRACT

A zoom tracking method for digital camera is disclosed. The method comprises storing a position table comprising data of several zoom position curves respect to positions of a focus lens and move the focus lens position by looking up said position table while moving a zoom lens position. The curves are divided into a first linear region, a second linear region and a nonlinear region to reduce the table size while still achieving good image quality.

12 Claims, 9 Drawing Sheets

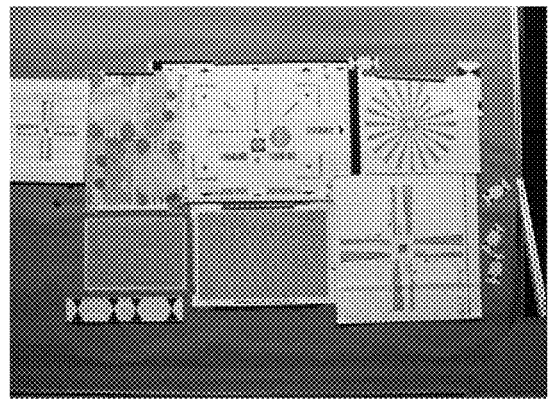
Fig. 5(A)
GS focus step: 26.
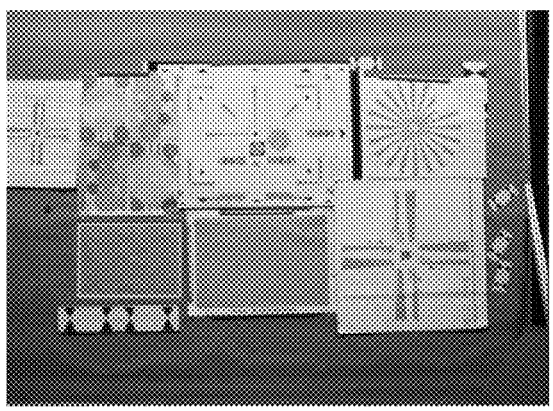 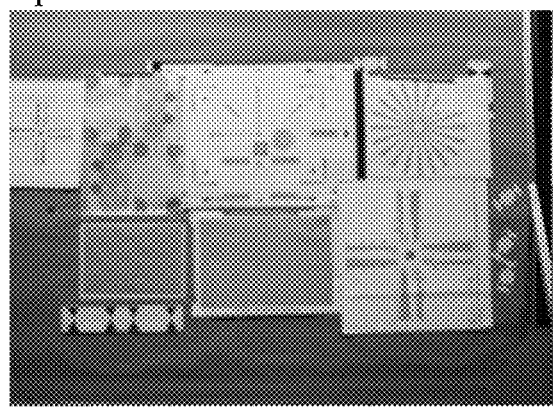
Fig.5(B1)
RZT zoom 1.
GS focus step: 32.
RZT focus step: 34.
Fig.5(B2)
UZT zoom 1.
GS focus step: 32.
UZT focus step: 44.
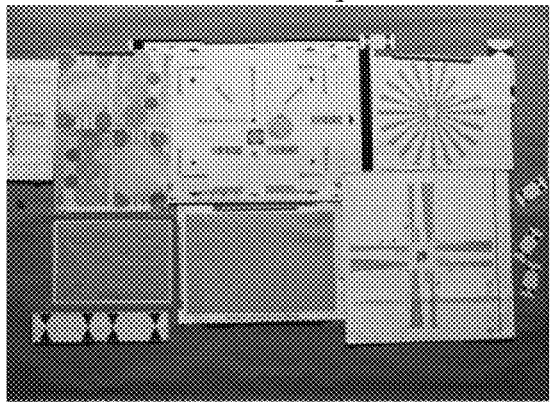 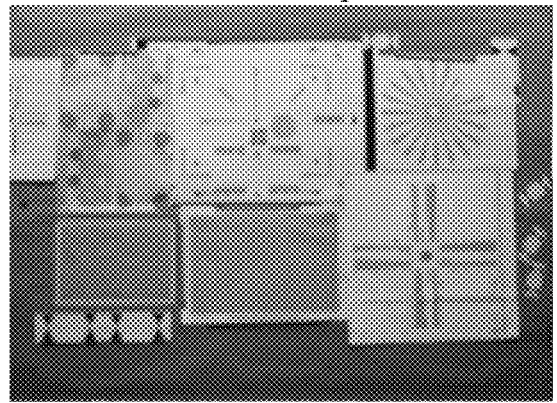
Fig.5(C1)
Fig.5(C2)

RZT zoom 2.
GS focus step: 52.
RZT focus step: 55.
UZT zoom 2.
GS focus step: 52.
UZT focus step: 67.
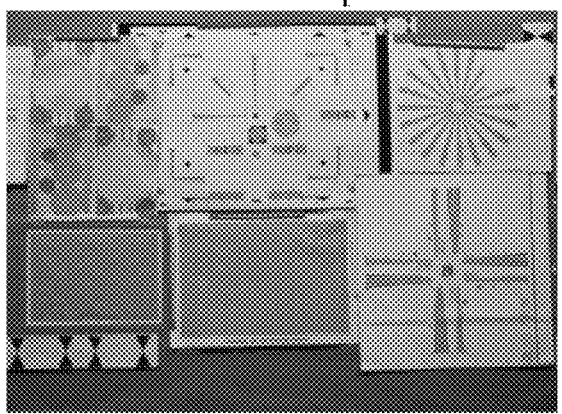 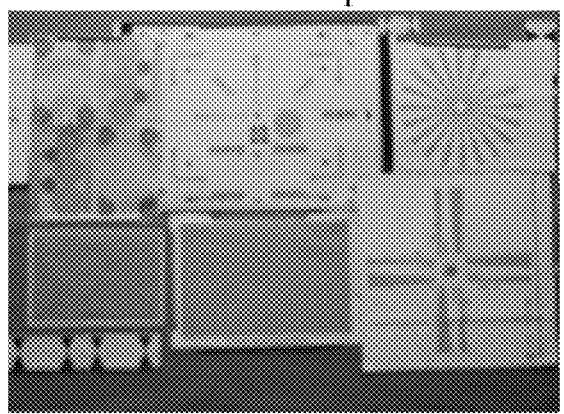
Fig.5(D1)
RZT zoom 3.
GS focus step: 72.
RZT focus step: 75.
Fig.5(D2)
UZT zoom 3.
GS focus step: 72.
UZT focus step: 89.

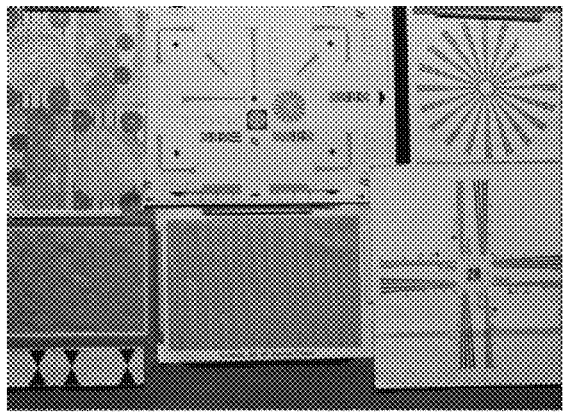 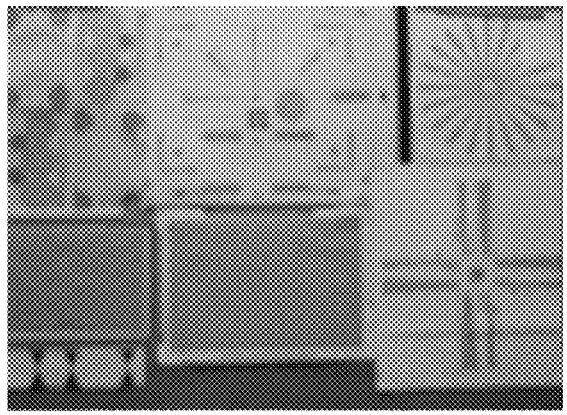
Fig.5(E1)
RZT zoom 4.
GS focus step: 90.
RZT focus step: 94.
Fig.5(E2)
UZT zoom 4.
GS focus step: 90.
UZT focus step: 117.

RZT zoom 5.
GS focus step: 108.
RZT focus step: 113.

UZT zoom 5.
GS focus step: 108.
UZT focus step: 142.

RZT zoom 6.
GS focus step: 124.
RZT focus step: 129.

UZT zoom 6.
GS focus step: 124.
UZT focus step: 148.

RZT zoom 7.
GS focus step: 125.

UZT zoom 7.
GS focus step: 125.

RZT focus step: 133.                    UZT focus step: 149.
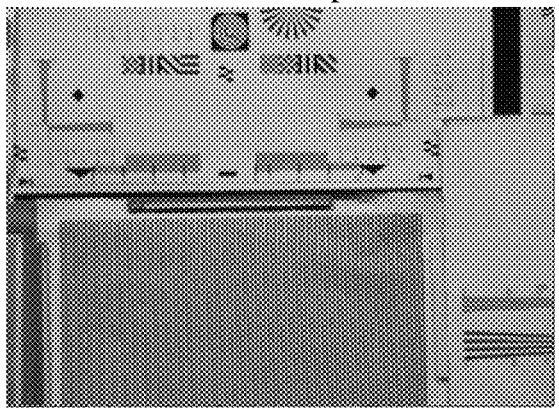 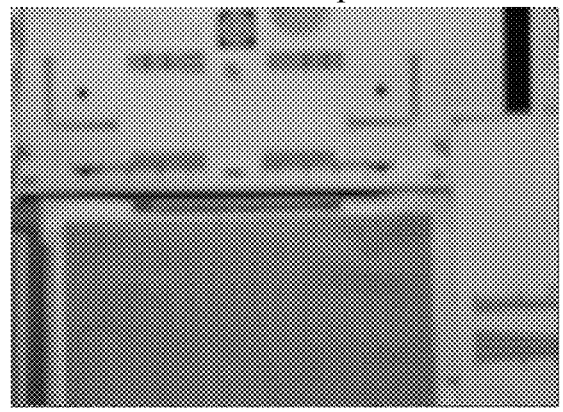
Fig.5(I1)
RZT zoom 8.
GS focus step: 108.
RZT focus step: 119.
Fig.5(I2)
UZT zoom 8.
GS focus step: 108.
UZT focus step: 147.

ZOOM TRACKING METHOD FOR DIGITAL CAMERA

FIELD OF THE INVENTION

The present invention relates to a zoom tracking method for digital camera.

BACKGROUND OF THE INVENTION

Zoom tracking adjusts a camera's focal length continuously, to keep the in-focus state of an image during zoom operation. Zoom tracking is important because we want the subjects always in focus even when we are zooming in or out. In DSC (digital still camera), we want the subjects always in focus in order to shorten the lens moving range while auto focusing. The zoom tracking technique can be implemented using a simple curve traced table-lookup method. We can store several zoom position curves with respect to the in-focus lens position, and move the focus lens position by looking up the position table while moving the zoom lens position. FIG. 1 shows the lens position curve. However, the table-lookup method needs a large system memory, which is often limited in portable devices. Another problem of zoom tracking is that the lens position curve selection gets harder while the zoom lens moves toward the telephoto angle. The de-focusing gradually increases as the zoom lens moves toward the telephoto end.

One zoom tracking method in the prior art is called "Adaptive Zoom Tracking". This algorithm uses the curve interpolation and estimation techniques. Each curve is divided into the linear and non-linear regions as shown in FIG. 2. Please refer to FIG. 2, in the linear region, the left and right end points are stored in the memory and the rest focus positions are calculated from the two points using the linear interpolation method. In the nonlinear region, the focus position at each zoom position is obtained from the stored curve data.

Curves between the upper and lower bound are estimated as in Equation (1).

$$F(k)=F_1(k)-R*D_f \quad (1)$$

where $F(k)$ and $F_1(k)$ are the focus position of the estimated and upper bound curves at zoom position k, respectively; R is the curve estimation factor of $d_f/D_f$, where $D_f$ is the difference between focus position of the upper and lower bound curves at the zoom position k, and $d_f$ is the difference of the focus position between the upper bound and the estimation curve at the same position.

The algorithm initially traces the upper bound curve since the difference between the focus positions of each curve is very small in the linear region; in non-linear region, the curve estimation factor is calculated. Finally, zoom curve interpolation and estimation are performed using the curve estimation method.

However, the adaptive zoom tracking mentioned above only traces the upper bound curve, where the loss of steps will get larger while the curve is closer to the lower bound.

In views of the above-described disadvantages resulted from the prior art, the applicant keeps on carving unflaggingly to develop a wireless mouse according to the present invention through wholehearted experience and research.

SUMMARY OF THE INVENTION

It is an object of the present invention to provide a zoom tracking method for digital camera which can reduce size of data while still deliver good image quality.

This invention providing a zoom tracking method for digital camera, the digital camera comprising a focus lens and a zoom lens, comprising: storing a position table comprising data of several zoom position curves respect to positions of said focus lens, and move the focus lens position by looking up said position table while moving said zoom lens position; wherein said curves are divided into a first linear region, a second linear region and a nonlinear region, and said position table comprising a first table for storing data of said first linear region, a second table for storing data of said second linear region and a third table for storing data of said nonlinear region.

In a preferred embodiment, the curves comprising nine zoom positions 1-9 and eight subject positions 1 to 8 and said first linear region comprising the first four zoom positions 1 to 4, said second linear region comprising the middle two zoom positions 5 and 6 and said nonlinear region comprising the last three zoom positions 7 to 9. In said first linear region, the eight subject positions are separated into a lower curve group, a middle curve group and a upper curve group. The upper curve group consisting of the first two subject positions 1 and 2, the middle curve group consisting of the middle four subject positions 3 to 6 and the lower curve group consisting of the last two subject positions 7 and 8.

In a preferred embodiment, the value of the upper curve group is gotten from averaging the values of the first two subject positions 1 and 2, the value of the middle curve group is gotten from averaging the values of the middle four subject positions 3 to 6 and the value of the lower curve group is gotten from averaging the values of the last two subject positions 7 and 8.

In a preferred embodiment, the zoom tracking method for digital camera according to claim 5, wherein the first table comprising data of (value of said lower curve group+value of said middle curve+value of said upper curve group)*(values of the four zoom positions 1 to 4).

In a preferred embodiment, in said second linear region, the eight subject positions are separated into a bottom curve, a lower curve group, a middle curve group and a upper curve group. The upper curve consisting of the first subject position 1, said lower curve group consisting of the subject positions 2 and 3, said middle curve group consisting of the subject positions 4 to 6 and said bottom curve group consisting of the subject positions 7 and 8.

In a preferred embodiment, the value of the upper curve is the value of the subject position 1, the value of said lower curve group is gotten from averaging the values of the subject positions 2 and 3, the value of the middle curve group is gotten from averaging the values of the subject positions 4 to 6 and the value of the bottom curve group is gotten from averaging the values of the subject positions 7 and 8.

In a preferred embodiment, the second table comprising data of (value of said bottom curve+value of said lower curve group+value of said middle curve group+value of said upper curve group)*(values of the two zoom positions 5 and 6).

In a preferred embodiment, in said nonlinear region each value of the eight subject positions 1 to 8 is value of a lowerbound curve+$D_f(d_s/D_s)$, wherein $D_s$ is the difference between the subject positions of an upper and a lower curves; $d_s$ is the difference between the subject positions of an estimated and the lower curves at a zoom start point, $D_f$ is the difference between the subject positions of the upper bound and the lower curves at current zoom point.

In a preferred embodiment, the third table comprising data of (values of the eight subject positions 1 to 9)*(values of the three zoom positions 7 to 9).

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
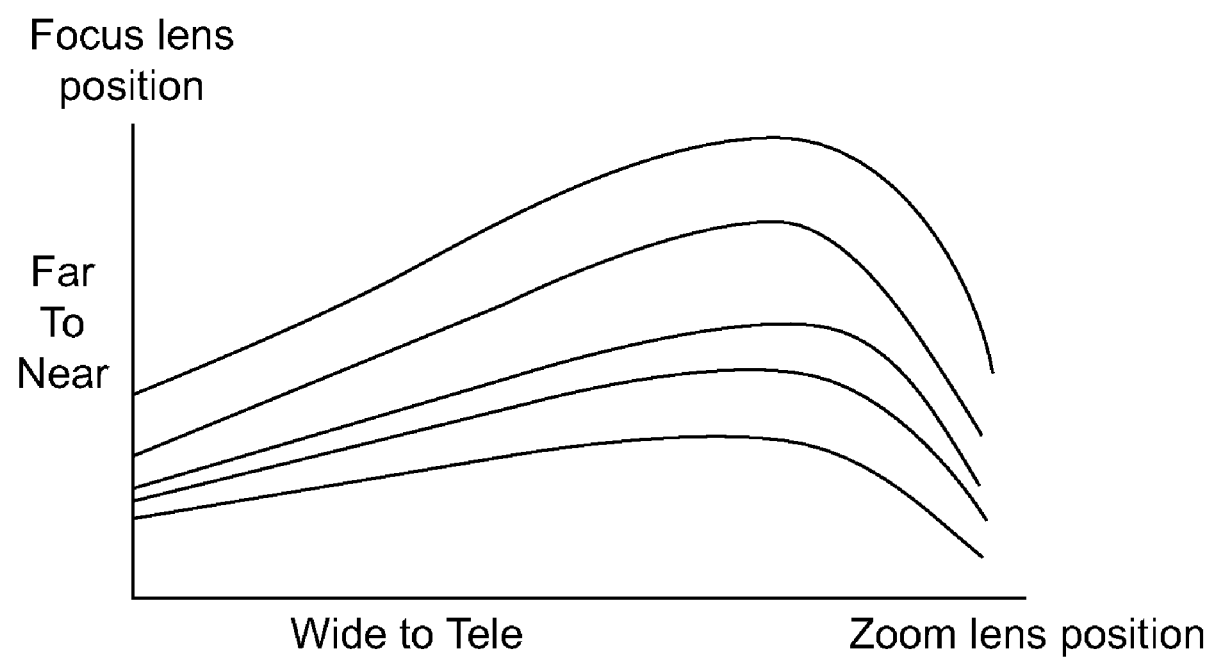
FIG. 1 shows an example of lens position curves.
Figure 2:
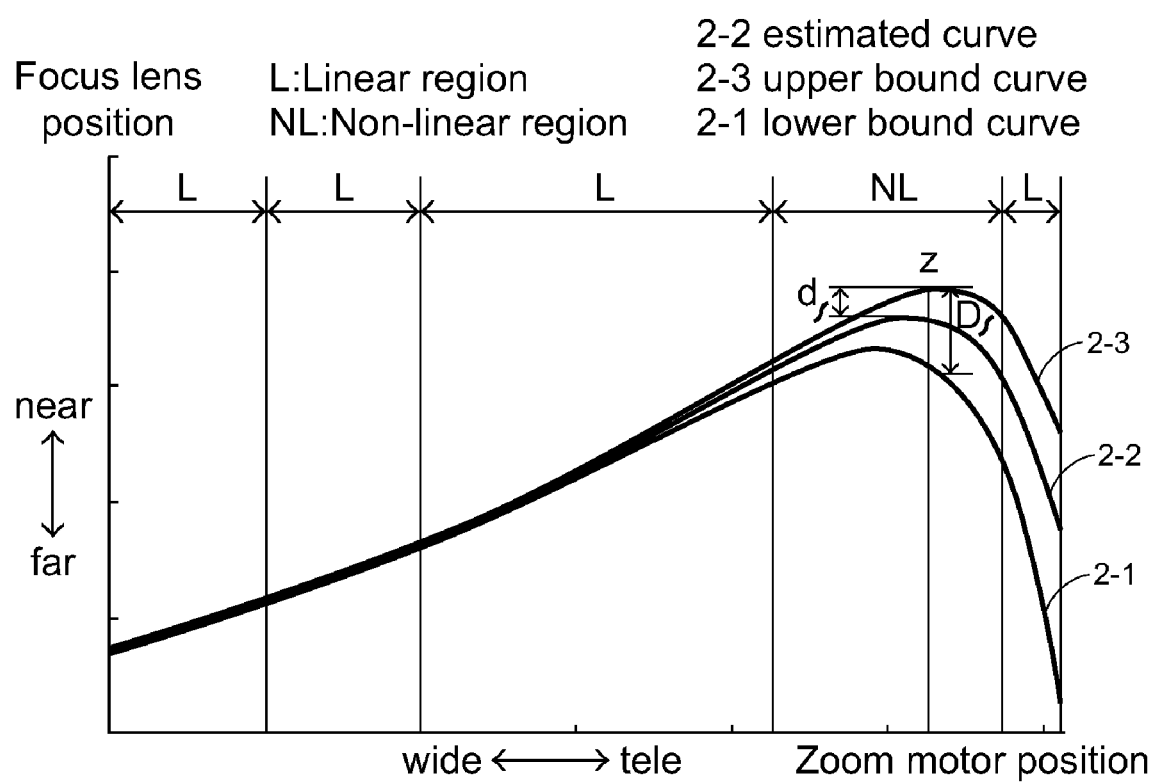
FIG. 2 shows linear and nonlinear regions of lens position curves of the Adaptive Zoom Tracking method of prior art.
Figure 3:
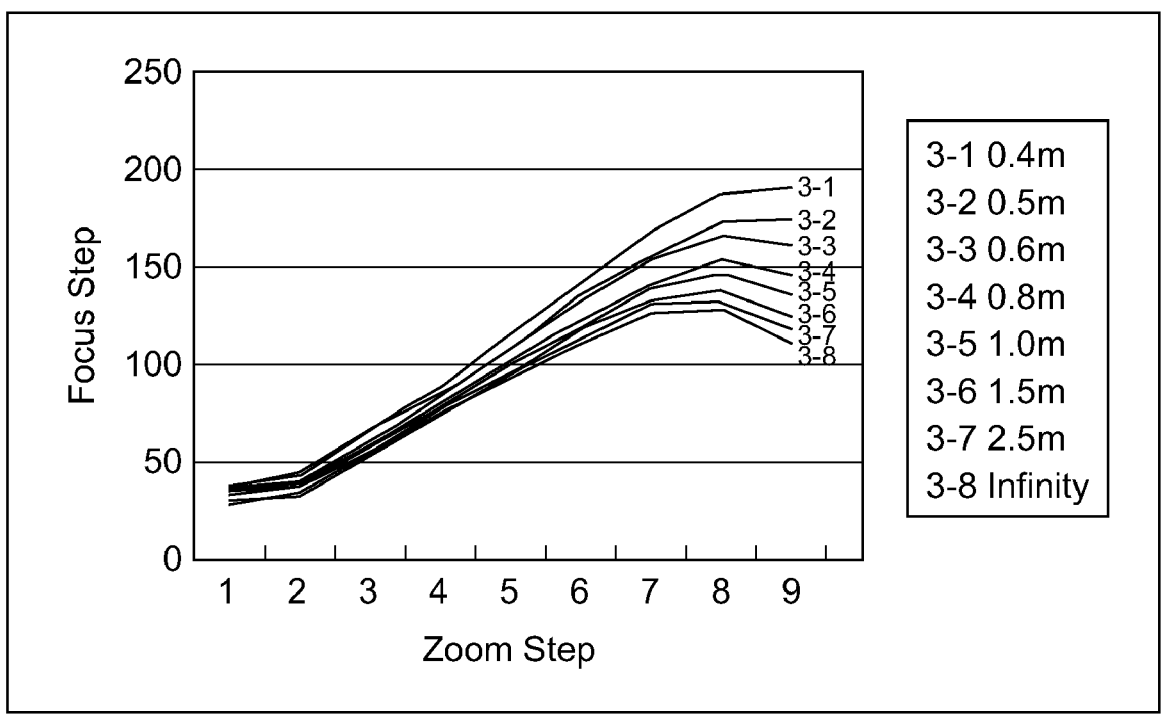
FIG. 3 shows the lens position curves with nine zoom positions.

Please refer to FIG. 3, it shows an example of lens position curves of this invention. We first cut the zoom step range into nine zoom positions, zoom 1 to zoom 9. For every zoom positions, we measure the focus step of eight different subject distances to construct zoom table. Therefore, we have 9*8=72 data shown in FIG. 3.

Figure 4:
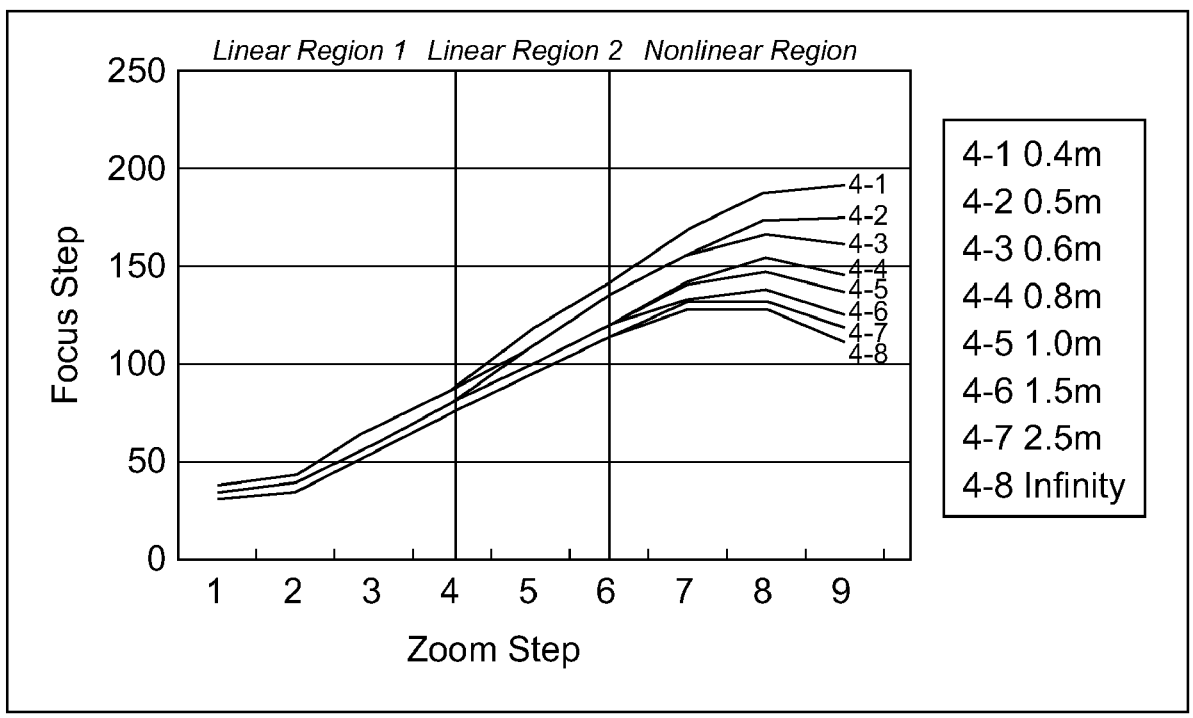
FIG. 4 shows the lens position curves divided into linear region 1, linear region 2 and nonlinear region of this invention.

Our goal is to reduce the data while still performing good zoom tracking image quality. We divide the data curve into Linear Region 1, Linear Region 2, and Nonlinear Region, as shown in FIG. 4, which means that we separate the data into three tables. However, we do not keep all the data; we only reserve the complete data in the Nonlinear Region.

In Linear Region 1, we extract the first four zoom positions' focus step from the original data. We will have 4*8=32 data, but we do not store all of them. Instead, we separate eight subject positions into three groups, the lower curve, the middle curve, and the upper curve. The upper curve consists of the first two subject positions, which is 0.4 m and 0.5 m, for nine zoom positions, and the values are gotten from averaging the values of two close subject positions, and both subject positions are set to the same value. The middle curve contains the middle four subject positions, 0.6 m, 0.8 m, 1 m, and 1.5 m. The value is set to the average value. The lower curve contains the last two subject positions, 2.5 m and infinity, and set to the average value. In this way, the original 32 data are reduced to 3 (lower, middle, and upper curve) *4 (zoom positions)=12 data, where 20 data are saved. The three curves are shown in the Linear Region 1 in FIG. 4.

Linear Region 2 uses the same concept to divide the data for the middle two zoom positions, which are 2*8=16 data. In this region, data are more dispersed. Therefore, we add one curve, bottom curve, for accuracy. Upper curve conserves the original data of 0.4 m. Lower curve sets the value by averaging 0.5 m and 0.6 m's focus step. Middle curve contains 0.8 m, 1.0 m, and 1.5 m. Bottom curve uses the average value of 2.5 m and infinity. Therefore, only 4 (bottom curve value+lower curve group value+middle curve group value+upper curve group value)*2 (zoom positions)=8 data will be stored in this region, which are 8 data saved. The four curves are shown in the Linear Region 2 in FIG. 4.

Once the data of Linear Region 1 and Linear Region 2 are stored, we can find our zoom tracking focus steps by directly looking up the table. The estimated curve's focus step is obtained by comparing the previous focus step to tables, finding its related focus step index, and getting next zoom position's focus step directly from the table.

In the nonlinear region, all curves are almost separated, so all data of the last three zoom positions are stored. The estimated curve's focus step is set by curve interpolation method in Equation (2).

$$\text{Estimated} = \text{LowerBound} + D_f \frac{d_s}{D_s} \qquad (2)$$

where Estimated represent the expected focus position we are looking for; LowerBound means the minimum focus position during the experiment; $D_s$ is the difference between the focus positions of the upper and the lower curves; $d_s$ is the difference between the focus positions of the estimated and the lower curves at the zoom start point; $D_f$ is the difference between the focus positions of the upper bound and the lower curves at current zoom point.

Combining the data of linear region 1, linear region 2 and nonlinear region, the stored data are 12 (first linear region)+8 (second linear region)+8*3 (nonlinear region)=44 data and the original data are 72 data. Therefore, the data is reduced by 44/72=61%, almost ⅓ data are saved.

Figure 5:
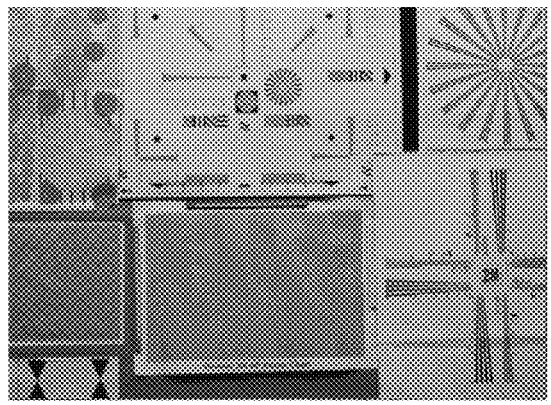
FIG. 5(A)-(I) shows experiment results of this invention and the prior art method.
Figure 5:
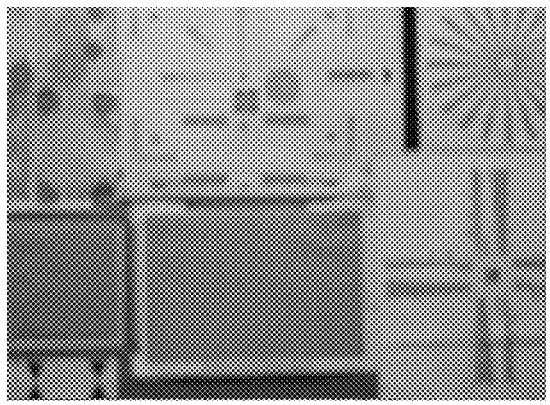
Figure 5:
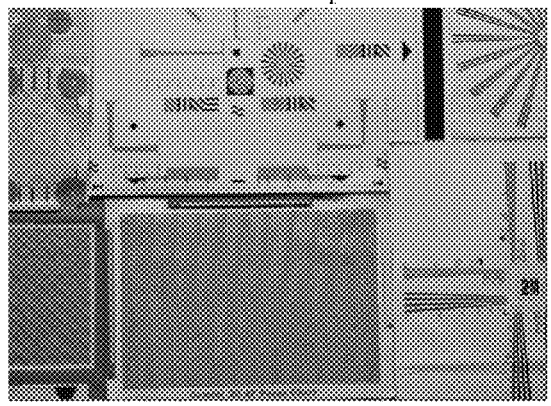
Figure 5:
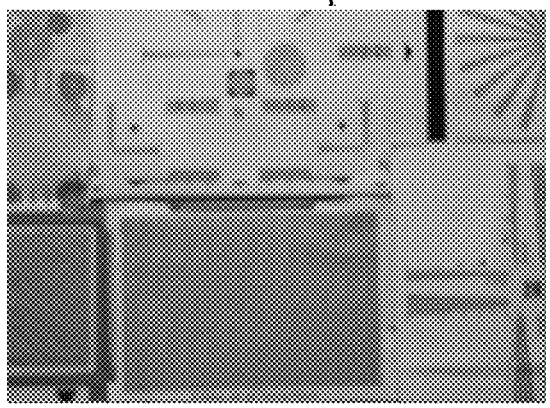
Figure 5:
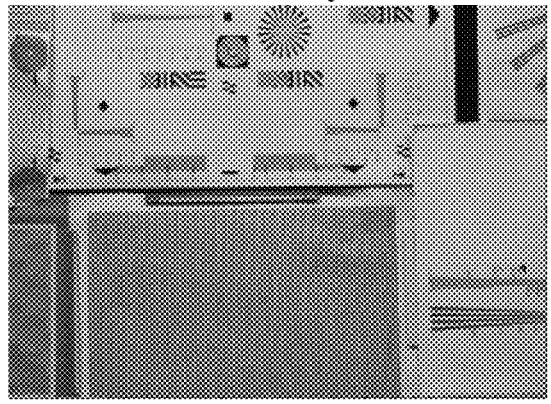
Figure 5:
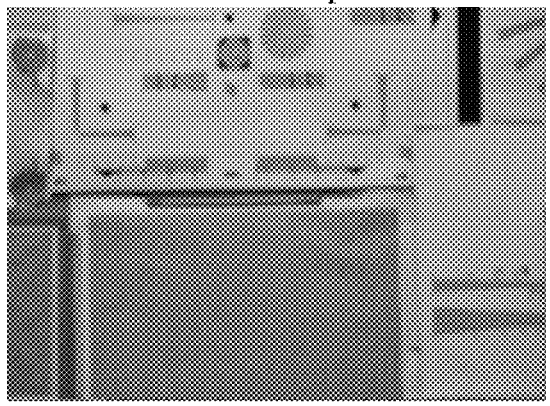

FIGS. 5(A) through 5(I2) show the experimental result of the reduced zoom tracking method (called RZT) of this invention and the adaptive zoom tracking method in the prior art which just traces the upper bound in the linear region (called UZT). FIG. 5 shows the results in visual comparison, and focus step error comparing with the focus step found by global search (GS). FIG. 5 explains the images from wide-angle to tele-photo.

FIG. 5(A) is the original, non-zooming image, and its focus step by GS is 26. We use the global search to ensure the best focus position. We start from this image, and begin zoom tracking. These images are down-sampled one-fourths. Compare 5(B1) and 5(B2), which is zoom position 1 in RZT and UZT, respectively. As we can see, 5(B1) is sharper than 5(B2). The focus step derived by RZT is 34, which is close to 32; the UZT focus step is 44, which means it has 12 steps error. The first five zoom steps are in linear region, and the last three are in non-linear region. RZT in FIGS. 5(B1) to 5(F1) are all sharper than UZT in FIGS. 5(B2) to 5(F2), and the focus steps of RZT are all closer to GS focus steps, while UZT all have large errors. In the non-linear region, compare 5(G1) and 5(G2), we can discover that 5(G1) still has the focus step close to GS, with 5(G2) still has a large error. However, when compared with 5(H1) and 5(H2), 5(H1) has a large step error in this scenario, while the focus step of RZT provides a larger error. In the final two figures, 5(I1) and 5(I2), RZT is still close to the GS focus steps.

To summarize, in the lens moving direction from wide-angle to tele-photo, our RZT method is shown to be more accurate than UZT while still shrinking the data size.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A zoom tracking method for digital camera, the digital camera comprising a focus lens and a zoom lens, comprising:
   storing a position table comprising data of several zoom position curves respect to positions of said focus lens;
   move the focus lens position by looking up said position table while moving said zoom lens position;
   wherein said curves are divided into a first linear region, a second linear region and a nonlinear region, and said position table comprising a first table for storing data of said first linear region, a second table for storing data of said second linear region and a third table for storing data of said nonlinear region.

2. The zoom tracking method for digital camera according to claim 1, wherein said curves comprising nine zoom positions 1-9 and eight subject positions 1 to 8 and said first linear region comprising the first four zoom positions 1 to 4, said second linear region comprising the middle two zoom positions 5 and 6 and said nonlinear region comprising the last three zoom positions 7 to 9.

3. The zoom tracking method for digital camera according to claim 2, wherein in said first linear region, the eight subject positions are separated into a lower curve group, a middle curve group and a upper curve group.

4. The zoom tracking method for digital camera according to claim 3, wherein said the upper curve group consisting of the first two subject positions 1 and 2, said middle curve group consisting of the middle four subject positions 3 to 6 and said lower curve group consisting of the last two subject positions 7 and 8.

5. The zoom tracking method for digital camera according to claim 4, wherein the value of the upper curve group is gotten from averaging the values of the first two subject positions 1 and 2, the value of the middle curve group is gotten from averaging the values of the middle four subject positions 3 to 6 and the value of the lower curve group is gotten from averaging the values of the last two subject positions 7 and 8.

6. The zoom tracking method for digital camera according to claim 5, wherein the first table comprising data of (value of said lower curve group+value of said middle curve+value of said upper curve group)*(values of the four zoom positions 1 to 4).

7. The zoom tracking method for digital camera according to claim 2, wherein in said second linear region, the eight subject positions are separated into a bottom curve, a lower curve group, a middle curve group and a upper curve group.

8. The zoom tracking method for digital camera according to claim 7, wherein said upper curve consisting of the first subject position 1, said the lower curve group consisting of the subject positions 2 and 3, said middle curve group consisting of the subject positions 4 to 6 and said bottom curve group consisting of the subject positions 7 and 8.

9. The zoom tracking method for digital camera according to claim 8, wherein the value of the upper curve is the value of the subject position 1, the value of said lower curve group is gotten from averaging the values of the subject positions 2 and 3, the value of the middle curve group is gotten from averaging the values of the subject positions 4 to 6 and the value of the bottom curve group is gotten from averaging the values of the subject positions 7 and 8.

10. The zoom tracking method for digital camera according to claim 9, wherein the second table comprising data of (value of said bottom curve+value of said lower curve group+value of said middle curve group+value of said upper curve group)*(values of the two zoom positions 5 and 6).

11. The zoom tracking method for digital camera according to claim 2, wherein in said nonlinear region each value of the eight subject positions 1 to 8 is value of a lowerbound curve+$D_f(d_s/D_s)$, wherein $D_s$ is the difference between the subject positions of an upper and a lower curves; $d_s$ is the difference between the subject positions of an estimated and the lower curves at a zoom start point, $D_f$ is the difference between the subject positions of the upper bound and the lower curves at current zoom point.

12. The zoom tracking method for digital camera according to claim 11, wherein the third table comprising data of (values of the eight subject positions 1 to 9)*(values of the three zoom positions 7 to 9).

* * * * *